C. PERLEY.
ENDTHRUST BEARING.
No. 37,765.  Patented Feb. 24, 1863.
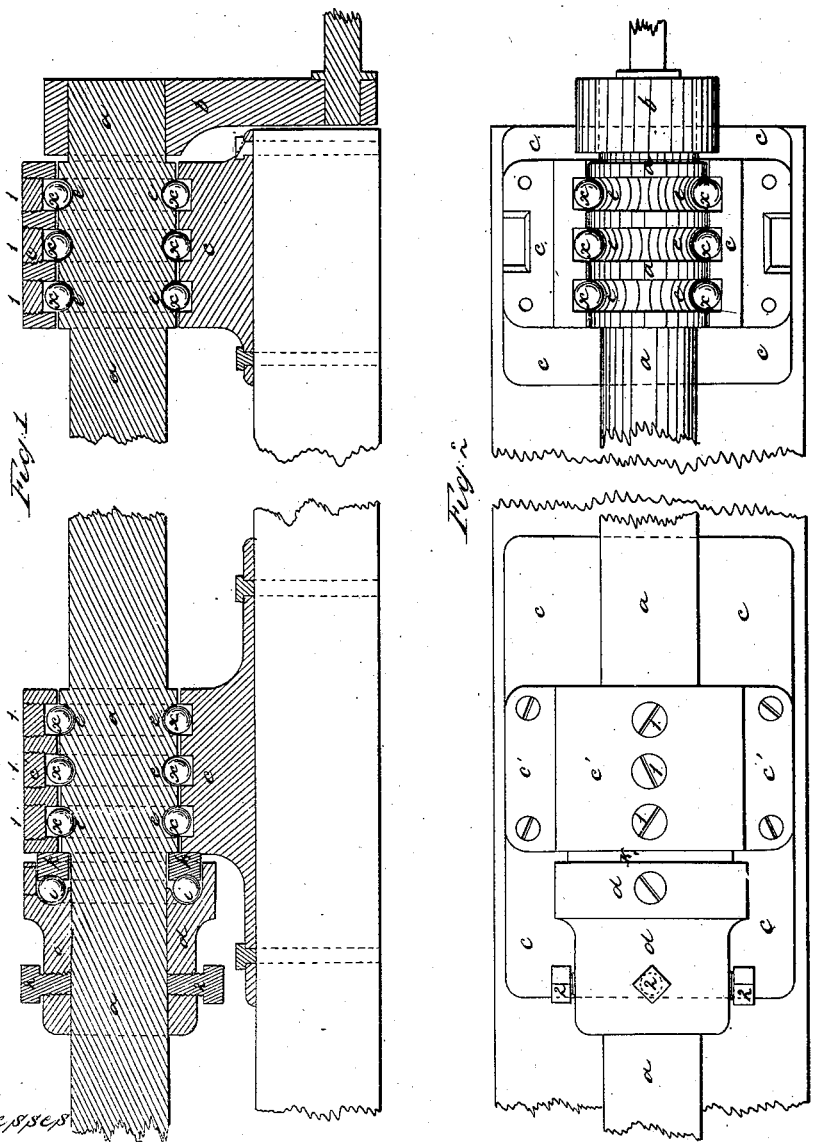

UNITED STATES PATENT OFFICE.

CHARLES PERLEY, OF NEW YORK, N. Y.

IMPROVEMENT IN END-THRUST BEARINGS.

Specification forming part of Letters Patent No. 37,765, dated February 24, 1863.

*To all whom it may concern:*

Be it known that I, CHARLES PERLEY, of the city and State of New York, have invented and made a certain new and useful Improvement in Bearings for Propeller-Shafts; and I do hereby declare that the following is a full, clear, and exact description of my said invention, reference being had to the annexed drawings, making part of this specification, wherein—

Figure 1 is a vertical section of a propeller-shaft with my improved bearings, and Fig. 2 is a plan of the same with the cap of one of the bearings removed.

Similar marks of reference indicate the same parts.

The nature of my said invention relates to the employment of balls between the propeller-shaft and the bearings or journal-boxes in such a manner that the end-thrust on the shaft from the action of the propeller in the water is taken upon balls.

It is well known that the journal-boxes of propeller-shafts often become heated, and the expansion caused thereby increases friction, and the machinery has to be stopped in order that such journals may cool, and this often renders it likely that the vessel may drift or get into dangerous situations in consequence of such stoppage. The cause of heating in journal-boxes of propellers is generally from lack of oil between the parts. The constant end-thrust on the propeller-shaft forces the oil out from between the bearing-surfaces of the collars employed, and hence speedy friction and heating ensue. The great weight and length of such shafts is also a prolific source of friction and heating. My invention obviates all the aforesaid difficulties, in the first place, by taking all the weight and thrust on the rolling surfaces of balls; and, second, by causing said balls to act as the lubricators, for, revolving in oil, they constantly bring up the oil to the moving surfaces, and the exclusion of oil in consequence of the close contact of the surfaces is prevented.

In the drawings, *a* is a propeller-shaft of any usual character, to one end of which the rotating power is applied in any usual manner by the crank *b* or otherwise, and the said shaft receives the propeller or paddle in any usual manner. *c c* represent the journal boxes or bearings supporting this shaft at the desired places along its length. The shaft *a* is formed with semicircular grooves at the points for these bearings, as at *e e*, and the interior surfaces of the bearing *c c* are formed with corresponding grooves. Within these grooves cast-steel or other suitable balls, *x x*, are placed, and in order to completely fill these grooves I provide screw-plugs, as at 1 1, by the removal of which said balls can be introduced after the caps *c'* are secured in place. These grooves and balls take the weight of the shaft, and would also receive the end-thrust, particularly with small shafts. I however prefer and use the collar *d*, formed with a concentric groove receiving balls *i i*, and also the edge of a steel or other suitable ring, *k*, setting against the side of the journal-box. The collar *d* is attached to the shaft by set-screws 2 2 or other suitable means, and the end-thrust of the propeller, as it acts in the water, is taken upon the rolling balls *i i*, whereby the friction is relieved and oil supplied into the annular chamber containing said balls by a suitable fountain is conveyed with the balls to all the surface exposed to the rolling friction.

By my aforesaid improved bearings very much friction is avoided, the heating of journals is prevented, and the propeller rendered much more efficient.

What I claim, and desire to secure by Letters Patent, is—

The collar *d* and balls *i i*, arranged and applied as set forth, to take the end-thrust of the propeller-shaft, as specified.

In witness whereof I have hereunto set my signature this 13th day of February, 1862.

CHARLES PERLEY.

Witnesses:
LEMUEL W SERRELL,
THOS. GEO. HAROLD.